US006765370B2

(12) United States Patent
Bradley

(10) Patent No.: US 6,765,370 B2
(45) Date of Patent: Jul. 20, 2004

(54) SYSTEM AND METHOD FOR BI-DIRECTIONAL POWER CONVERSION IN A PORTABLE DEVICE

(75) Inventor: Larry D. Bradley, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 10/150,302

(22) Filed: May 17, 2002

(65) Prior Publication Data

US 2003/0214271 A1 Nov. 20, 2003

(51) Int. Cl.[7] .......................... G05F 1/652; G05F 1/656
(52) U.S. Cl. .................... 323/222; 323/259; 323/282
(58) Field of Search ............................... 323/222, 224, 323/259, 282, 283

(56) References Cited

U.S. PATENT DOCUMENTS

| | | | | | |
|---|---|---|---|---|---|
| 4,736,151 A | * | 4/1988 | Dishner | ........................ | 323/224 |
| 4,743,812 A | * | 5/1988 | Dishner | ........................ | 318/14 |
| 4,801,859 A | * | 1/1989 | Dishner | ........................ | 323/224 |
| 5,359,280 A | * | 10/1994 | Canter et al. | ................ | 323/282 |
| 5,998,977 A | * | 12/1999 | Hsu et al. | .................... | 323/272 |
| 6,348,781 B1 | * | 2/2002 | Midya et al. | ................ | 323/224 |
| 6,369,461 B1 | * | 4/2002 | Jungreis et al. | ................ | 307/46 |
| 6,404,172 B1 | * | 6/2002 | May | ............................ | 323/268 |
| 6,424,207 B1 | * | 7/2002 | Johnson | ........................ | 327/552 |
| 6,501,194 B1 | * | 12/2002 | Jiang et al. | .................... | 307/66 |
| 6,608,396 B2 | * | 8/2003 | Downer et al. | ........... | 290/40 C |

* cited by examiner

Primary Examiner—Bao Q. Vu

(57) ABSTRACT

A system and a method are provided for bi-directional power conversion in a portable device. The system uses a single inductor to perform both buck and boost power conversion operations and a controller to supply signals to two switches, enabling electric current paths. The system includes a battery connected to ground and to an inductor terminal. The first switch has a terminal connected to a portable device power bus, a second terminal connected to a second inductor terminal, and an input to accept a control signal. The second switch has a terminal connected to the second inductor terminal, a second terminal connected to a portable device ground, and an input to accept a control signal. Controller inputs accept the bus voltage and the battery voltage and outputs supply power conversion control signals to the switches in response to evaluating the bus and battery voltages. The controller supplies buck power conversion control signals to: close the first switch and open the second switch to build up voltage across the inductor to reduce the voltage supplied to the battery by an external power supply connected to the bus; and to open the first switch and close the second switch to discharge the inductor built-up voltage to the battery. The controller supplies boost power conversion control signals to open the first switch and close the second switch to build up voltage across the inductor and to close the first switch and open the second switch to add the inductor built-up voltage to the voltage supplied by the battery to the bus.

8 Claims, 5 Drawing Sheets

SYSTEM AND METHOD FOR BI-DIRECTIONAL POWER CONVERSION IN A PORTABLE DEVICE

BACKGROUND OF THE INVENTION

1. Field of the Invention

This invention generally relates to electronics and, more particularly, to battery power management in a wireless communications device.

2. Description of the Related Art

Portable devices, such as wireless communications devices, are equipped with batteries to provide power for device operations when the device is used in its portable mode. However, there are at least two problems associated with the use of batteries in a portable device. First, battery parameters and the voltage requirements for portable device circuitry can prevent a portable device from extracting the full amount of power available in a battery, as explained below. Second, because portable device batteries have limited capacities for storing and supplying power, batteries must be periodically recharged by an external power supply or battery charger. Unfortunately, the charger typically supplies voltage at a level higher than is usable by the battery.

FIG. 5 is a graph of portable device battery voltage level plotted against portable device battery power discharge (prior art). The axes of the graph are unitless. Regarding the first problem, FIG. 5 shows two voltage levels, $V_{ckt}$ and $V_{batt}$. $V_{ckt}$ is the minimum voltage level required for the operation of the circuitry in a portable device and $V_{batt}$ is the minimum voltage level to which the battery can be discharged without harm to the battery. One curve shown on FIG. 5 is for a conventional battery, such as lithium ion, and the second curve is for a newer type of battery, lithium-sulfide (LiS). Note that the position and proportion of $V_{ckt}$, $V_{batt}$, and the battery curves are approximate and represent typical cases. Other positions and proportions are possible. When a conventional battery voltage level is above $V_{ckt}$, the battery is able to supply power to operate the portable device. When the battery voltage level is between $V_{ckt}$ and $V_{batt}$, the battery still has power available for use, but the battery is not providing voltage at a level sufficient to allow operation of the device. That is, the battery can still be discharged until the battery voltage drops to $V_{batt}$. Lithium sulfide batteries have greater power storage capacity than lithium ion batteries, but as shown on FIG. 5, the voltage provided by the batteries can be below $V_{ckt}$. Therefore, to extract all the power available in a conventional battery and to use the power available from a LiS battery, it is known to use a boost converter to raise the level of the voltage provided by a battery to a value at or above $V_{ckt}$.

Regarding the second problem, the voltage incompatibility between an external power supply and a portable device battery, it is known to use a buck converter in the portable device to buck (step-down) the voltage level supplied by the external power supply to the device battery.

It is known to provide separate boost and buck converters in portable devices. However, there are at least two disadvantages associated with the use of separate converters: an increase in the number of components used in a portable device; and, a subsequent increase in the cost of the portable device. A wireless communications device is used as an example to illustrate these disadvantages. However, it should be appreciated that these disadvantages apply to other portable devices and even non-portable devices as well. Advances in technology and manufacturing techniques permit wireless communications devices to be made increasingly smaller, which in turn, creates a need to reduce the space required for components in the devices by reducing the number and/or size of the components.

Unfortunately, providing separate converters increases the number of components in a wireless device. The subsequent increase in space usage can limit the size to which a wireless device can be reduced, or can limit space available in the wireless device for other components. In most wireless devices, a buck converter may be necessary to properly charge the device battery. However, due to the space constraints noted above, a choice may be necessary between optimizing battery performance and optimizing space usage in the device. For example, a choice may be necessary between the options of adding a boost converter to maximize power utilization for a lithium ion device battery and omitting the boost converter to save space in the device. With a LiS battery, the problem is exacerbated. As described above, it may not be possible to use a LiS battery at all without a converter to boost the battery voltage to a level at or above $V_{ckt}$.

Accordingly, it would be advantageous if the number of components used to buck and boost voltage levels in a portable device could be reduced. This would help reduce the size and cost of devices requiring buck and boost converters, particularly wireless communications devices.

SUMMARY OF THE INVENTION

The present invention addresses buck and boost power conversion operations in electronic devices, particularly wireless communications devices. The invention recognizes that space and costs for components are limitations in wireless communications devices. The invention addresses these problems by using a same set of components to perform both buck and boost power conversion operations in a portable device, thereby reducing the number of components used in the portable device.

Accordingly, a system is presented for bi-directional power conversion in a portable device. The system uses a single inductor to both buck voltage from an external power supply to a battery and boost battery voltage to a portable device power bus. A controller supplies control signals opening and closing first and second switches, enabling electric current paths for implementing buck and boost power conversion operations. The battery has a terminal connected to ground and a second terminal connected to an inductor terminal. The first switch has a terminal connected to the power bus, a second terminal connected to a second inductor terminal, and an input to accept a control signal. The second switch has a terminal connected to the second inductor terminal, a second terminal connected to ground, and an input to accept a control signal. The controller has inputs to accept the bus voltage and the battery voltage and outputs to supply power conversion control signals to the switches in response to evaluating the bus and battery voltages.

The controller supplies buck power conversion control signals to: close the first switch and open the second switch to build up voltage across the inductor to reduce the voltage supplied to the battery by an external power supply connected to the bus; and to open the first switch and close the second switch to discharge the inductor built-up voltage to the battery. The controller supplies boost power conversion control signals to open the first switch and close the second switch to build up voltage across the inductor and to close the first switch and open the second switch to add the inductor built-up voltage to the voltage supplied by the battery to the bus. In one aspect of the system, transistors, specifically metal-oxide-semiconductor field effect transistors (MOSFETs), are used for the switches.

Additional details of the above-described system, and a method for bi-directional power conversion in a portable device are provided below.

DETAILED DESCRIPTION OF THE PREFERRED EMBODIMENTS

Figure 1:
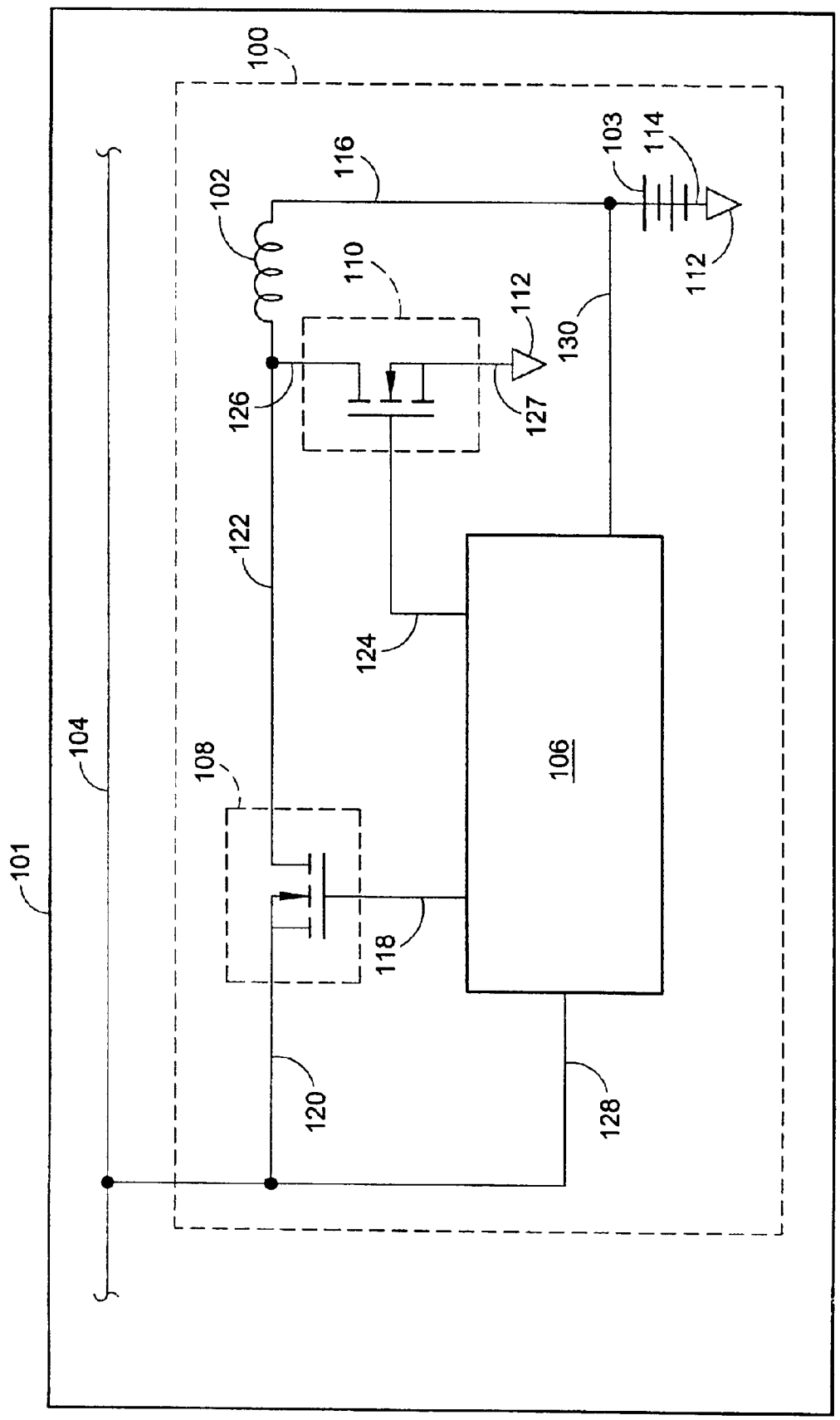
FIG. 1 is a schematic block diagram depicting the system for bi-directional power conversion in a portable device in accordance with the present invention.

FIG. 1 is a schematic block diagram depicting the system 100 for bi-directional power conversion in a portable device in accordance with the present invention. The system 100 is applicable to a portable device 101. The following is an overview of the operation of the system 100. Details regarding the operation of the system 100 are given further below. The system 100 uses a single inductor 102 to both buck voltage from an external power supply (not shown) to a battery 103 and boost voltage from the battery 103 to a device power bus 104. A controller 105 supplies power conversion control signals opening and closing a first switch 108 and a second switch 110, enabling electric current paths among the inductor 102, the battery 103, the power bus 104, and a portable device ground 112. The current paths are used to implement buck and boost power conversion operations.

The battery 103 has a terminal connected to the portable device ground 112 on line 114 and a terminal connected to an inductor 102 on line 116. The switch 108 has an input to accept a control signal on line 118, a terminal connected to the power bus 104 on line 120, and a terminal connected to the inductor 102 on line 122. The switch 110 has an input to accept a control signal on line 124, a terminal connected to the inductor 102 on line 126, and a terminal connected to the ground 112 on line 127. The controller 106 has inputs to accept the bus 104 voltage on line 128 and the battery 103 voltage on line 130 as portable device 101 reference voltage signals. The controller 106 has outputs to supply buck and boost power conversion control signals to switches 108 and 110 on lines 118 and 124 respectively, in response to the reference voltage signals.

External power supplies used to recharge portable device batteries typically supply voltage at levels too high for use by the battery. Therefore, buck power conversion operations are performed in a portable device to buck or step-down the voltage supplied by an external power supply. The controller 106 is coupled to the bus 104. The controller 106 engages buck power conversion operations when two conditions are met. First, the bus 104 voltage is greater than a predetermined external power threshold value, indicating that an external power supply (not shown) is connected to the bus 104. Second, battery 103 voltage is less than a predetermined full charge threshold value, indicating that the battery 103 is not fully charged and can, therefore, accept recharging by the external power supply. If the bus 104 voltage is greater than the external power threshold value, and the battery 103 voltage is greater than the full charge threshold value (that is, the battery 103 is fully charged), the controller 106 supplies signals opening switches 108 and 110. In this manner, the battery 103 is isolated from the power bus 104 and external power supply voltage is supplied directly to the bus 104, conserving the charge on battery 103.

The buck power conversion operations entail a cycle of building up and discharging voltage across the inductor 102. For purposes of illustration, the cycle is described as having first and second parts. However, it should be understood that the starting point for the cycle may varying depending on actual conditions in the portable device 101. For the first part of the cycle, the controller 106 supplies buck power conversion control signals for the following operations: opening the switch 110 to isolate the inductor 102 from the ground 112 and closing the switch 108 to create an electric current path from an external power supply (not shown) through the inductor 102 to the battery 103. The current flowing through the inductor 102 builds up voltage across the inductor 102. The inductor 102 voltage is opposite in polarity to the power supply voltage and, therefore, acts to reduce the voltage supplied to the battery 103 by the power supply to levels usable by the battery 103.

When a voltage at battery 103 or the current through inductor 102 reaches a predetermined value, the controller 106 engages the second part of the buck power conversion cycle and supplies control signals for the following operations: opening the switch 108 to interrupt electric current flow from the power supply through the inductor 102 to the battery 103 and closing the switch 110 to create an electric current path from the ground 112 through the inductor 102 to the battery 103. The new current path causes the polarity of the inductor 102 voltage to reverse, causing the inductor 102 to discharge the built-up voltage to the battery 103. Thus, a buck power conversion process is implemented. In the buck power conversion process, the inductor 102 is charged from an external power supply (not shown) and then discharged into the battery 103. This process is repeated continually during charging of the battery 103.

During the buck power conversion cycle, the external power supply voltage is supplied directly to the bus 104. This allows operation of the device 101 while charging the battery 103.

Boost power conversion control operations are used to boost the voltage supplied by the battery 103. The controller 106 engages boost power conversion operations when the bus 104 voltage is less than the external power threshold value, indicating that an external power supply is not connected to the bus 104, and the battery 103 voltage is less than a predetermined circuit threshold value, indicating that the battery 103 voltage is below a value required or preferred for operation of circuitry in the device 101.

Like the buck power conversion operations, the boost power conversion operations entail a cycle of building up and discharging voltage across the inductor 102, and like the buck power conversion operations, the cycle is described in terms of first and second parts for purposes of illustration. For the first part of the cycle, the controller 106 supplies boost power conversion control signals for opening the switch 108 to interrupt electric current flow from the battery 103 through the inductor 102 to the bus 104. The bus 104 draws power from a capacitor (not shown) connected to the bus 104 while the switch 108 is open. The capacitor is charged as explained below. The controller 106 also supplies control signals for closing the switch 110 to create an electric current path from the battery 103 through the inductor 102 to the ground 112. As a result of the current flow, a voltage builds up across the inductor 102.

When the built-up voltage across the inductor 102 reaches a predetermined value, the controller 106 engages the second part of the boost power conversion cycle and supplies control signals for the following operations: opening the switch 110 to interrupt electric current flow from the battery 103 though the inductor 102 to the ground 112 and closing the switch 108 to create an electric current path from the battery 103 through the inductor 102 to the bus 104. The polarity of the inductor 102 built-up voltage reverses to match the polarity of the battery 103 voltage. Thus, the inductor 102 voltage is added to the battery 103 voltage, raising the voltage on line 122 to a level usable by the bus 104. The capacitor connected to the bus 104, as described above, is charged during the second part of the cycle.

The cycles of building up voltage across the inductor 102 and discharging the built-up voltage, as described above, are controlled by the duty cycles for the switches 108 and 110. The duty cycle for switch 108 or 110 is the percentage of time the respective switch is closed (enabled) in the power conversion sequences described above. In the buck power conversion mode, neglecting losses, the duty cycles are proportional to the power supply voltage level and the desired battery 103 voltage level. For example, if the power supply voltage is double the desired battery 103 voltage, the duty cycles for switches 108 and 110 are both approximately 50 percent. That is, the two parts of the buck power conversion cycle described above are approximately equal in duration. If the power supply voltage is greater than twice the desired battery 103 voltage, switch 110 has a longer duty cycle (is on for a longer period of time) than switch 108.

In the boost power conversion mode, neglecting losses, the bus 104 voltage ($V_{bus}$) is equivalent to the battery 103 voltage ($V_{batt}$) divided by the difference of 1 minus the duty cycle of switch 110. That is, the switch 110 duty cycle is equivalent to $[1-(V_{batt}/V_{bus})]$. For example, if the desired bus 104 voltage is twice the battery 103 voltage, the duty cycles of switches 108 and 110 are both 50 percent. If the desired bus 104 voltage is four times the battery 103 voltage, the duty cycles of switches 108 and 110 are 25 percent and 75 percent, respectively.

In some aspects of the system, transistors are used for the switches 108 and 110. In one aspect, metal-oxide-semiconductor field effect transistors (MOSFETs) are used. The gates of the MOSFETs accept the control signals from the controller 106. The sources and drains of the MOSFETs are used for the switch terminals described. In another aspect, field effect transistors (FETs) are used.

Figure 2:
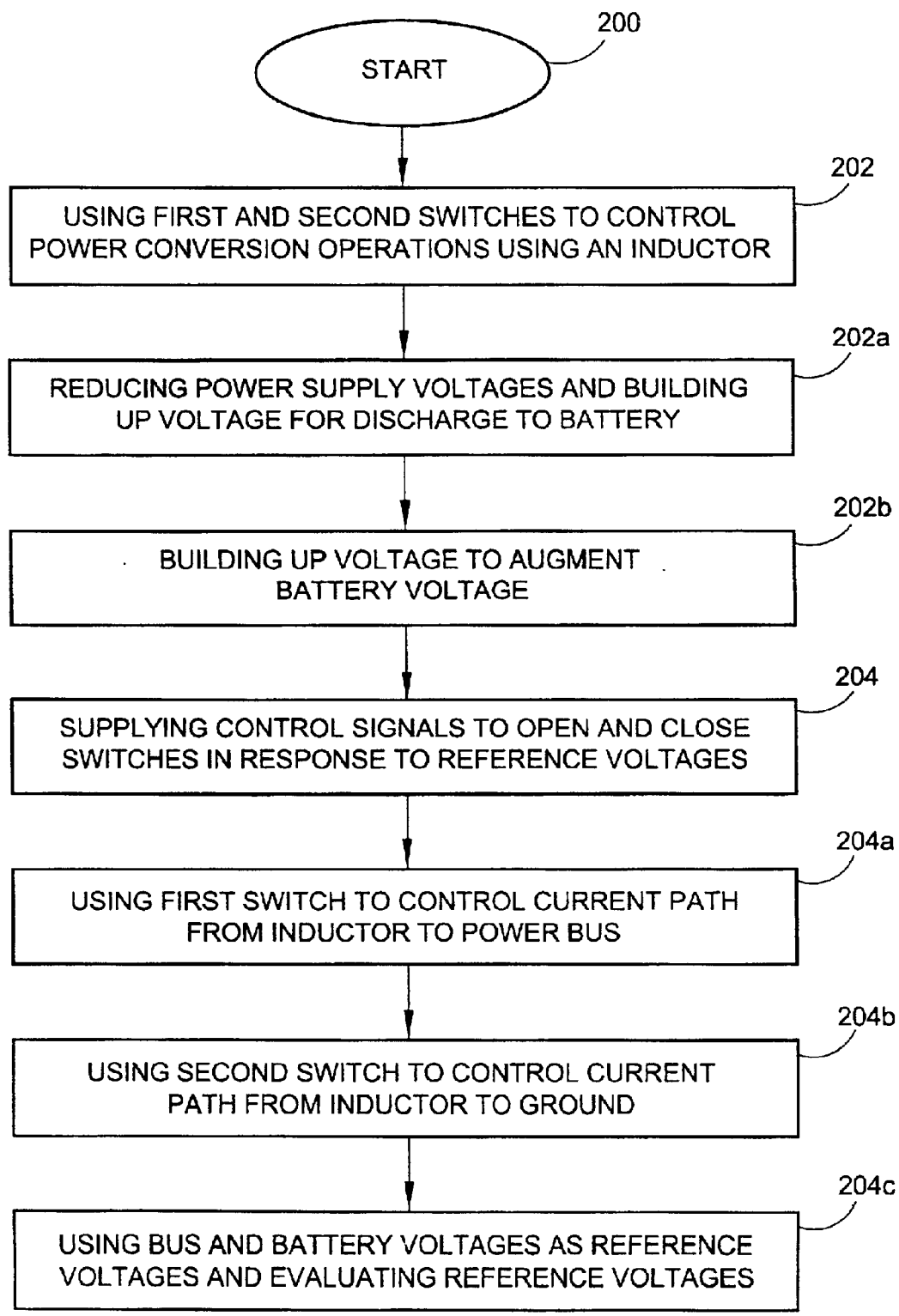
FIG. 2 is a flowchart illustrating the method for bi-directional power conversion in a portable device in accordance with the present invention.

FIG. 2 is a flowchart illustrating the method for bi-directional power conversion in a portable device in accordance with the present invention. Although the method in FIG. 2 (and FIGS. 3 and 4 below) is depicted as a sequence of numbered steps for clarity, no order should be inferred from the numbering unless explicitly stated. The method starts at Step 200. Step 202 uses first and second switches to control buck and boost power conversion operations using an inductor. Step 202a reduces voltage levels supplied by an external power supply and builds up voltage for discharge to a battery. Step 202b builds up voltage to augment voltage supplied by the battery to a portable device power bus. Step 204 supplies power conversion control signals from a controller to open and close the switches in response to portable device reference voltages. Step 204a uses the first switch to control an electric current path from the inductor to the bus. Step 204b uses the second switch to control an electric current path from the inductor to a portable device ground. Step 204c uses the bus voltage and the battery voltage as reference voltages and evaluates the power bus voltage and the battery voltage in the controller.

In one aspect of the method, using first and second switches to control buck and boost power conversion operations using an inductor in Step 202 includes using transistors for the switches, either MOSFETs or FETs. In one aspect of the method, using the bus voltage and the battery voltage as reference voltages and evaluating the power bus voltage and the battery voltage in the controller in Step 204c includes engaging buck power conversion operations in response to bus voltages greater than a predetermined external power threshold value and battery voltages less than a predetermined full charge threshold value, engaging boost power conversion operations in response to bus voltages less than a predetermined external power threshold value and battery voltages less than a predetermined circuit threshold value, and determining a duty cycle for the first and second MOSFETs during buck and boost power conversion operations in response to comparing the power bus voltage and the battery voltage.

Figure 3:
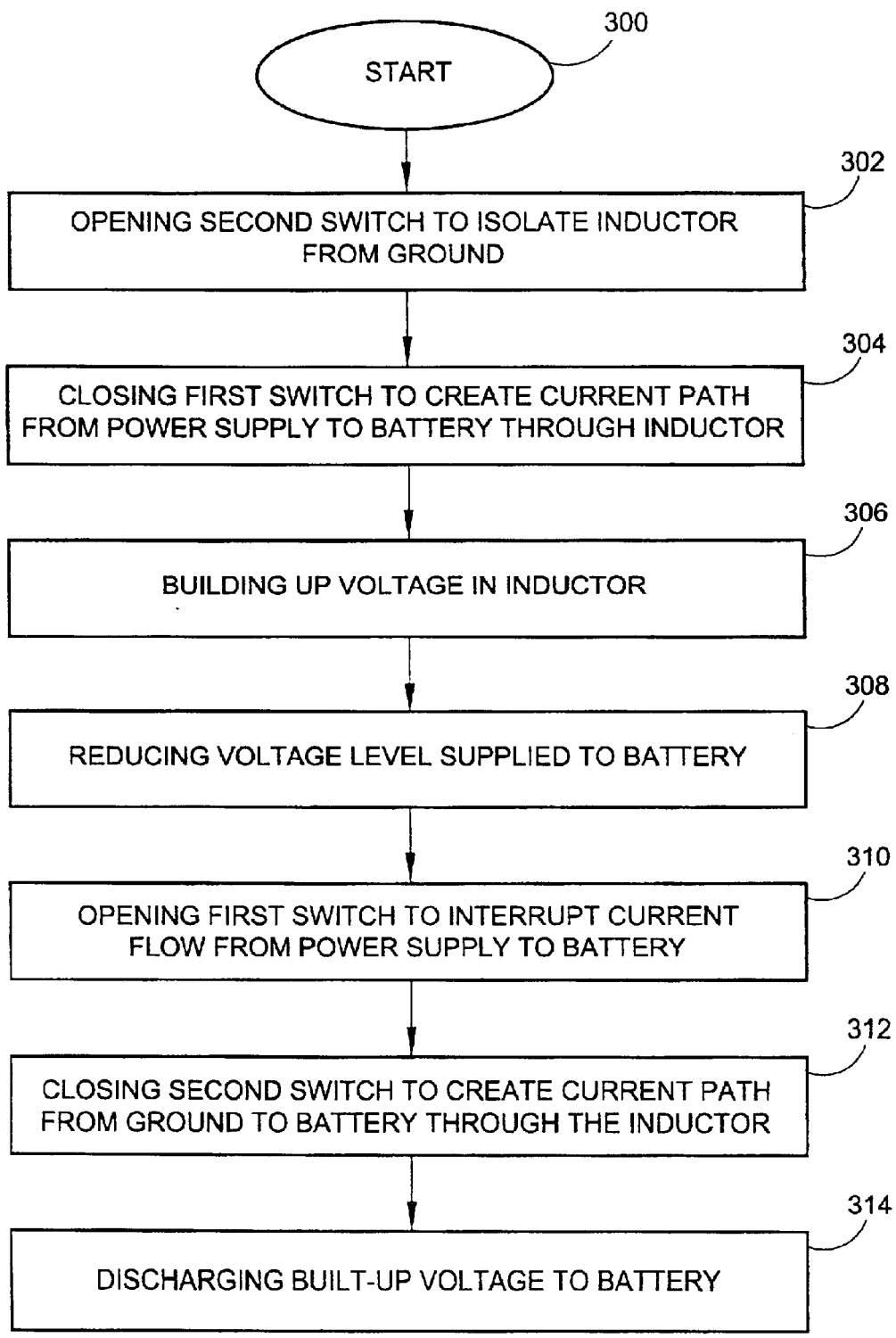
FIG. 3 is a flowchart showing in further detail the method illustrated in FIG. 2.

FIG. 3 is a flow chart showing in further detail the method illustrated in FIG. 2. The method starts at Step 300. Step 302 opens the second switch to isolate the inductor from the ground. Step 304 closes the first switch to create an electric current path from the power supply through the inductor to the battery. Step 306 builds up voltage across the inductor in response to electric current flow. Step 308 reduces a voltage level supplied to the battery by the power supply in response to the built-up inductor voltage. Step 310 opens the first switch to interrupt electric current flow from the power supply through the inductor to the battery. Step 312 closes the second switch to create an electric current path from the ground through the inductor to the battery. Step 314 discharges the built-up inductor voltage to the battery.

Figure 4:
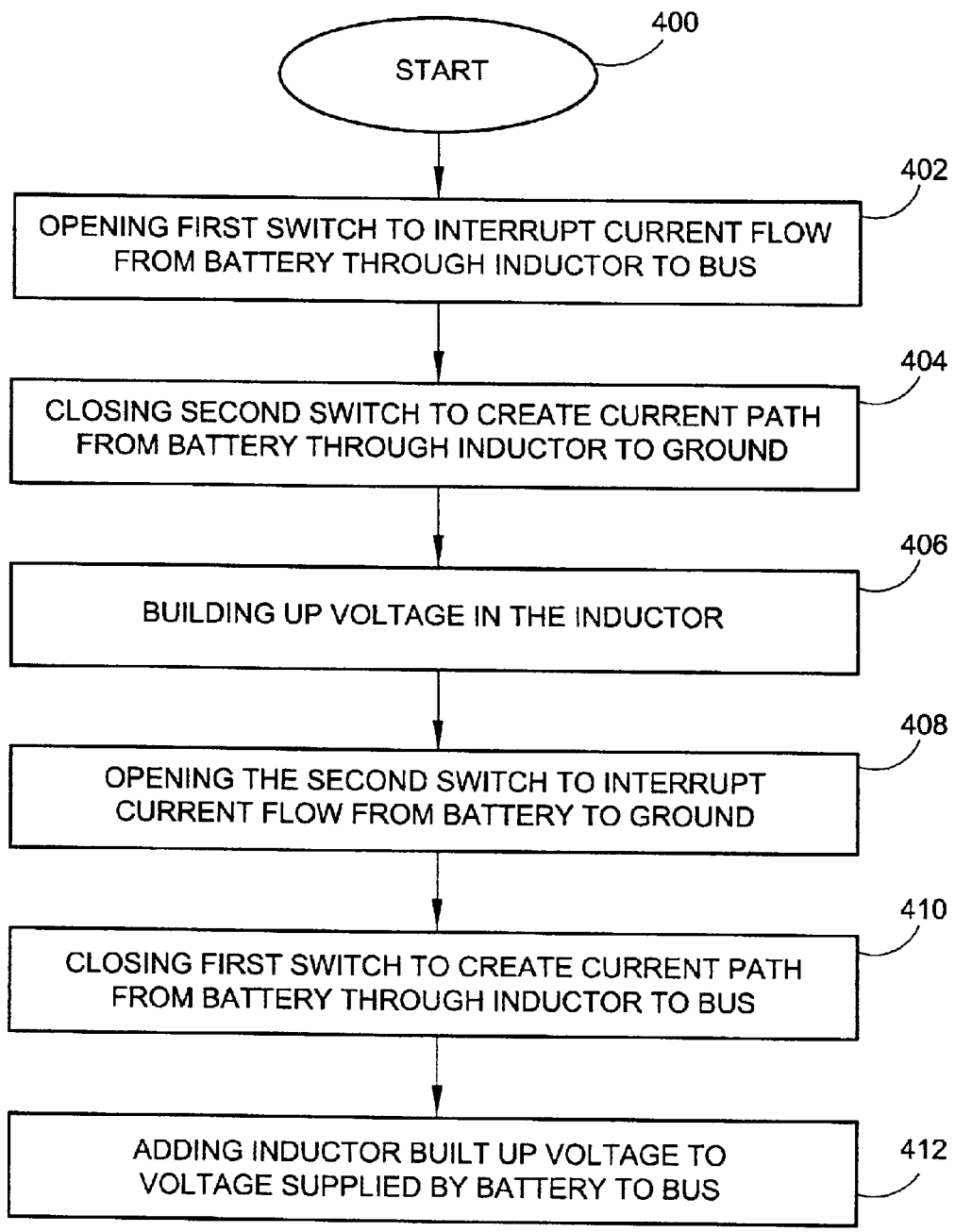
FIG. 4 is a flowchart showing in further detail the method illustrated in FIG. 2.
Figure 5:
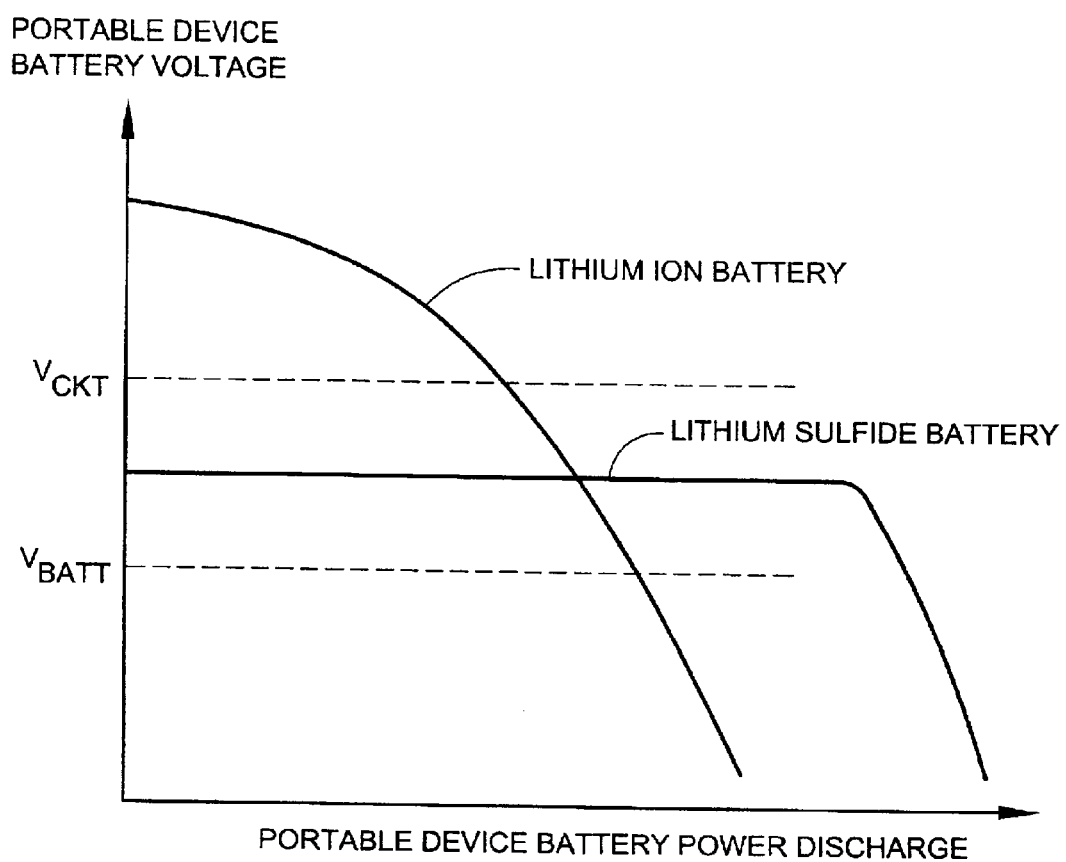
FIG. 5 is a graph of portable device battery voltage level plotted against portable device battery power discharge (prior art).

FIG. 4 is a flow chart showing in further detail the method illustrated in FIG. 2. The method starts at Step 400. Step 402 opens the first switch to interrupt electric current flow from the battery through the inductor to the bus. Step 404 closes the second switch to create an electric current path from the battery through the inductor to the ground. Step 406 builds up voltage across the inductor in response to electric current flow. Step 408 opens the second switch to interrupt electric current flow from the battery though the inductor to the ground. Step 410 closes the first switch to create an electric current path from the battery through the inductor to the bus. Step 412 adds inductor built-up voltage to voltage supplied by the battery to the bus.

A system and a method are provided for bi-directional power conversion in a portable device. Examples of the present invention have been enabled with wireless communications devices and with lithium ion and LiS batteries. However, it should be understood that the present invention is not limited to any particular portable device or rechargeable battery type. The present invention system and method also are applicable to a wide range of portable devices including lap top computers, personal digital assistants, pagers, digital cameras, music players, and electronic games and to other battery types including nickel metal hydride (NiMH) and nickel-cadmium (NiCd). Other variations and embodiments of the present invention will occur to those skilled in the art.

I claim:

1. A method for bi-directional power conversion in a wireless communications device, the method comprising:

using first and second metal-oxide-semiconductor field effect transistors (MOSFETs) and an inductor to control buck and boost power conversion operations; and, supplying first and second, independent power conversion control signals to the first and second MOSFETs, respectively, from a controller responsive to a portable device power bus voltage and a battery voltage; and, wherein controlling buck power conversion operations includes:

turning the first MOSFET on and turning the second MOSFET off to create an electric current path from the bus to the battery through an inductor, building up voltage across the inductor and reducing voltage received by the battery from an external power supply connected to the bus; and, turning the first MOSFET off and turning the second MOSFET on to create an electric current path from a portable device ground to the battery through the inductor, discharging inductor built-up voltage to the battery; and, wherein controlling boost power conversion operations includes:

turning the first MOSFET off and turning the second MOSFET on to create an electric current path from the battery to the ground through the inductor, building up voltage across the inductor; and, turning the first MOSFET on and turning the second MOSFET off to create an electric current path from the battery to the bus through the inductor, adding inductor built-up voltage to the voltage supplied by the battery to the bus.

2. A system for bi-directional power conversion in a portable device, the system comprising:

a battery having a first terminal, and a second terminal connected to ground;

an inductor with a first terminal connected to the battery first terminal, and a second terminal;

a first switch with an input to accept a first control signal, a first terminal connected to a portable device power bus, and a second terminal connected to the inductor second terminal;

a second switch with an input to accept a second control signal, independent of the first control signal, a first terminal connected to the inductor second terminal, and a second terminal connected to a portable device ground; and, a controller with inputs to accept portable device reference voltage signals, and outputs to supply the first and second control signals to the first and second switches, respectively, in response to the reference voltage signals, wherein a diode is not connected across respective first and second terminals of each of the first and second switches.

3. The system of claim 2 wherein the controller receives bus voltage and battery voltage reference signals and in response supplies a first buck power conversion signal and a second buck power conversion control signals to:

close the first switch and open the second switch, respectively, to build up voltage across the inductor and to reduce the voltage supplied to the battery by an external power supply connected to the bus; and, open the first switch and close the second switch, respectively, to discharge the inductor built-up voltage to the battery.

4. The system of claim 3 wherein the controller receives bus voltage and battery voltage reference signals and in response supplies a first boost power conversion signal and a second boost power conversion control signals to:

open the first switch and close the second switch, respectively, to build up voltage across the inductor; and, close the first switch and open the second switch, respectively, to add the inductor built-up voltage to the voltage supplied by the battery to the bus.

5. The system of claim 4 wherein the first and second switches are transistors.

6. The system of claim 5 wherein the transistors are metal-oxide-semiconductor field effect transistors (MOSFETs).

7. The system of claim 5 wherein the transistors are field effect transistors (FETs).

8. A system for bi-directional power conversion in a wireless communications device, the system comprising:

a battery with a first terminal connected to ground and a second terminal;

an inductor with a first terminal connected to the battery second terminal, and a second terminal;

a first metal-oxide-semiconductor field effect transistor (MOSFET) with a source connected to a portable device power bus, a drain connected to the inductor second terminal, and a gate to accept a first control signal;

a second MOSFET with a drain connected to the inductor second terminal, a source connected to a portable device ground, and a gate to accept a second control signal, independent of the first control signal, wherein a diode is not connected across respective drain and source of each of the first and second MOSFETs; and, a controller with inputs to accept the bus voltage and the battery voltage and outputs to supply first and second power conversion control signals to the first and second MOSFET gates, respectively, in response to evaluating the bus and battery voltages; and, wherein the controller supplies a first buck power conversion signal and a second buck power conversion control signals to:

turn the first MOSFET on and turn the second MOSFET off, respectively, to build up voltage across the inductor and to reduce the voltage supplied to the battery by an external power supply connected to the bus; and, turn the first MOSFET off and turn the second MOSFET on, respectively, to discharge the inductor built-up voltage to the battery; and, wherein the controller supplies a first boost power conversion signal and a second boost power conversion control signals to:

turn the first MOSFET off and turn the second MOSFET on, respectively, to build up voltage across the inductor; and, turn the first MOSFET on and turn the second MOSFET off, respectively, to add the inductor built-up voltage to the voltage supplied by the battery to the bus.

* * * * *